Oct. 3, 1939.  ERNST-AUGUST CORNELIUS  2,175,143
GYROSCOPIC APPARATUS
Filed June 2, 1937  2 Sheets—Sheet 1
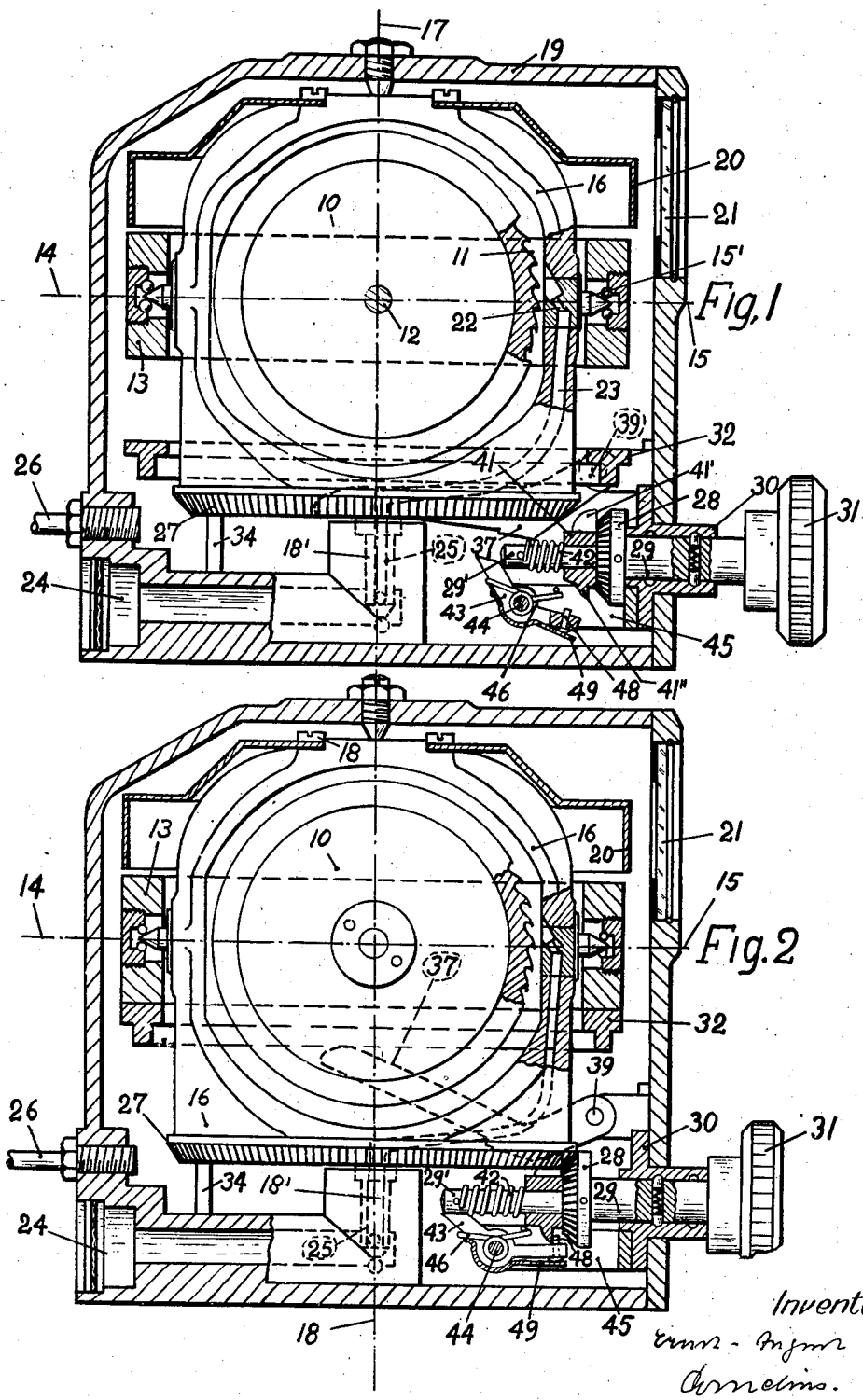
Inventor:
Ernst-August Cornelius.

Oct. 3, 1939.   ERNST-AUGUST CORNELIUS   2,175,143
GYROSCOPIC APPARATUS
Filed June 2, 1937    2 Sheets-Sheet 2

Inventor:
Ernst-August
Cornelius

Patented Oct. 3, 1939

2,175,143

UNITED STATES PATENT OFFICE 2,175,143

GYROSCOPIC APPARATUS

Ernst-August Cornelius, Berlin-Charlottenburg, Germany, assignor to Askania-Werke A. G., a corporation of Germany Application June 2, 1937, Serial No. 146,079
In Germany May 8, 1936

6 Claims. (Cl. 74—5)

This invention relates to improvements in gyroscopic apparatus especially designed for use on craft. More particularly this invention relates to directional gyroscopes.

It is an object of this invention to increase the directive force of the gyroscope by enlarging its spinning mass without, however, enlarging the size of the apparatus by means of a novel arrangement of the parts of the gyroscope.

It is a further object of this invention to provide a novel caging device for aligning the gyro rotor bearing ring with a horizontal plane and arresting the ring in a horizontalized position. Caging devices are more particularly used for preventing a precesssion movement of the gyroscope during a correction of its azimuth position.

As far as applicant is aware the conventional caging devices of the type for aligning and arresting the rotor bearing frame irrespective of the azimuth position of the gyroscope, comprise movable parts such as levers, on the gyro frames or rings. Experiments have shown that even very small play between the movable parts on the frames will cause sufficient unbalance of the gyro apparatus as to set up precession movements which either diminish the directive force of the gyroscope or cause errors in the azimuth position of the gyroscope.

It is therefore a further object of the invention to provide a novel caging device in which movable parts on the gyro frames are avoided.

Further aims, objects and advantages of this invention will appear from a consideration of the description which follows with the accompanying drawings showing an embodiment of this invention for illustrative purposes. It is to be understood, however, that this description is not to be taken in a limiting sense, the scope of this invention being defined in the appended claims.

Referring to the drawings:

Fig. 1 is an elevation of a directional gyroscope some parts being shown in section;

Fig. 2 shows the gyroscope of Fig. 1 in arrested position;

Figure 3:
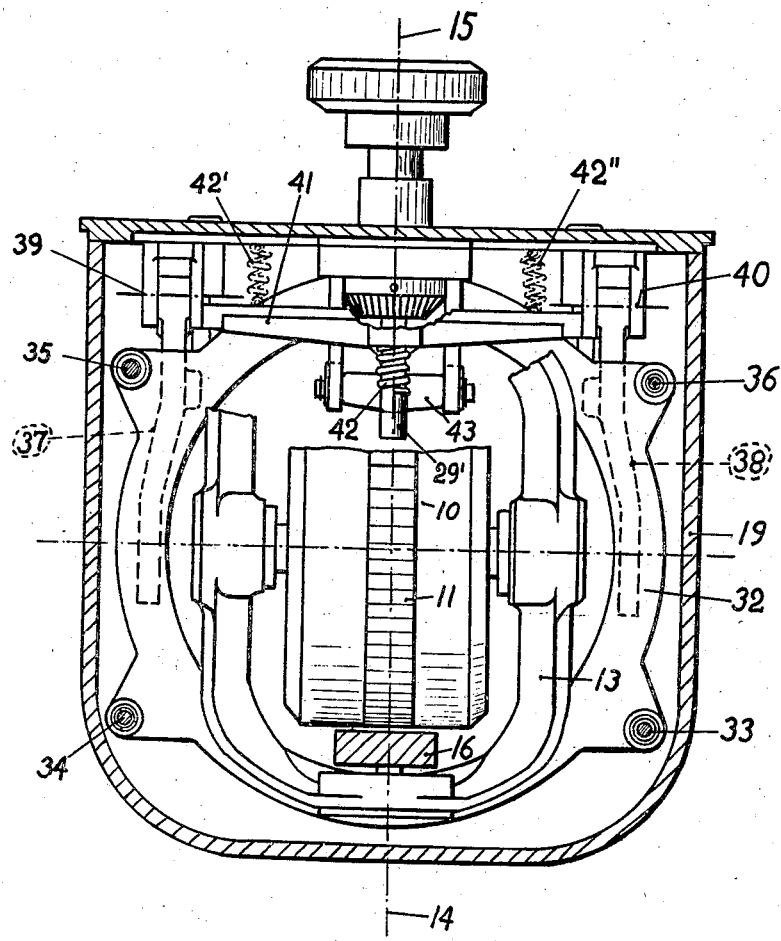
Fig. 3 is a plan view of the gyroscope, partly in section, some parts being broken away.

A gyro rotor 10 having buckets 11 on the periphery thereof is rotatably mounted with its shaft 12 in a rotor bearing ring 13 to spin on a normally horizontal axis. The rotor bearing ring 13 is supported for oscillation about a second normally horizontal axis 14, 15 at right angles to the spinning axis in a vertical or azimuth frame 16. The rotor bearing ring is shown as surrounding the vertical frame 16, which is of semi-circular shape at the inside providing space for a gyro rotor of relatively large diameter. The vertical frame 16 is rotatable about a normally vertical axis 17, 18 in an outer support shown as being a gyro casing 19 and may be provided with a compass card 20 visible through a window 21.

The gyro rotor may be driven by any suitable motive power such as, for example, a jet of air issuing from a nozzle 22 built in the vertical frame so as not to project therefrom. In the illustrated example the nozzle is formed by a hole drilled into a trunnion 15'. Air is supplied to the nozzle 22 through the vertical frame which is shown as being partly hollow to provide a passage 23 for air therethrough. Air at atmospheric pressure enters the casing at 24 and passes through a channel 25 of the lower and hollow vertical bearing 18'. Air is constantly withdrawn from the casing through a pipe coupling 26, thereby causing the air entering at 24 to issue from the nozzle 22 in form of a jet to drive the rotor.

This novel arrangement of the rotor bearing ring and the driving nozzle permits an enlargement of the gyro rotor and a corresponding increase of the directive force of the gyroscope by seven times without enlarging the size of the gyroscope casing as compared to the conventional construction.

For setting the gyroscope in azimuth a large gear 27 is shown as secured to the vertical frame 16. Associated with the gear 27 is a pinion 28 secured to a shaft 29, 29' the latter being mounted for rotation and axial displacement in a sleeve 30 and provided for manual operation with a knob 31. In the position shown in Fig. 1 the gear and pinion are out of engagement while in Fig. 2 the gear is shown in engagement with the knob 31 pushed inwardly.

To prevent a precessional movement of the rotor bearing ring about the axis 14, 15 and also for arresting the gyroscope in or aligning the rotor bearing ring with a horizontal plane a caging ring 32 is provided. The caging ring is guided for vertical movement in bolts 33, 34, 35, 36 and extends around the vertical 16.

For moving the caging ring into contact with the rotor bearing ring 13 levers 37 and 38 are provided in the illustrated form. The levers are pivoted on the outer support or casing at 39 and 40 and bear against the one side of the caging ring. For actuating the levers there is provided a cam member 41 having a cam surface 41', the member being mounted for movement in the direction of the shaft 29. The cam member is movable relatively to the shaft 29 and is normally held in the inactive position by the action of a spring 42. In place of the spring 42 springs 42' and 42" may be employed as indicated in dotted lines in Fig. 3.

In order to maintain the rotor bearing ring arrested until after a setting of the gyroscope in azimuth the gear 27, 28 is disengaged, a detent is provided shown in the illustrated example as having the form of a double armed lever 43 pivoted at 44 in a bracket 45 of the casing or outer support 19. A spring 46 of the safety pin type tends to move the lever clockwisely. A resilient catch 48 under action of a flat spring 49 allows a lower finger 41" of the cam member to pass into the arrested position shown in Fig. 2.

The operation of the caging device is as follows. By pushing the knob 31 and shaft 29, 29' inwardly the detent is moved into the operative position by the extension 29' imparting a counter-clockwise movement to the same. Simultaneously the cam 41' operates the levers 37, 38 for arresting the rotor bearing ring 32. After arresting the rotor bearing ring the pinion 28 is moved into engagement with the gear 27. The device is now in the position shown in Fig. 2 and the gyroscope may be corrected in azimuth by turning the knob.

After the correction the knob 31 is pulled outwardly, whereby the gear and pinion become disengaged. The detent 43, however, still maintains the cam member in the arresting position until finally, after the gear has become disengaged, the extension 29' of the shaft 29 slips off the left arm of the lever 43 and the cam member is moved by spring action into the normal inactive position.

It is thus prevented that a correction movement may be imparted to the vertical frame while the rotor bearing ring is free to tilt about its axis.

Obviously the present invention is not restricted to the particular embodiment thereof herein shown and described. Moreover, it is not indispensable that all the features of this invention be used conjointly, since they may advantageously be employed in various combinations and subcombinations.

What is claimed is:

1. Directional gyroscope comprising, in combination, a gyroscope casing; a vertical frame mounted within said casing for turning about a substantially vertical axis and having a passage for air therethrough; a rotor bearing ring surrounding said vertical frame and mounted thereon for oscillation about a substantially horizontal axis; an air spun gyro rotor mounted within said rotor bearing ring on a substantially horizontal spinning axis at right angles to said horizontal oscillation axis; a trunnion forming a part of one bearing between said vertical frame and said rotor bearing ring having a part separate from and extending through the vertical frame, said trunnion part, within the vertical frame having an air passage communicating with said passage in the frame discharging against the rotor, the outlet of said air passage being substantially flush with the inner surface of said vertical frame; and means to supply spinning air to said passage.

2. In a directional gyroscope an outer support; a vertical frame mounted on said outer support for turning about a substantially vertical axis; a rotor bearing ring surrounding said vertical frame and mounted thereon for oscillation about a substantially horizontal axis; a gyro rotor mounted within said rotor bearing ring on a substantially horizontal spin axis at right angles to said horizontal oscillation axis; a substantially horizontal caging ring surrounding said vertical frame mounted within said support for displacement in a vertical direction; and manually operable means for vertically moving said caging ring into contact with said rotor bearing ring, whereby the rotor bearing ring may be aligned with and arrested in a horizontal plane.

3. In a directional gyroscope an outer support; a vertical frame mounted on said outer support for turning about a substantially vertical axis; a rotor bearing ring mounted on said vertical frame for oscillation about a substantially horizontal axis; a gyro rotor mounted within said rotor bearing ring on a substantially horizontal spin axis at right angles to said horizontal oscillation axis; a substantially horizontal caging ring surrounding said vertical frame and mounted within said support for displacement in a vertical direction; and manually operable means for vertically moving said caging ring into contact with said rotor bearing ring, whereby the rotor bearing ring may be aligned with and arrested in a horizontal plane.

4. In a directional gyroscope an outer support; a vertical frame mounted on said outer support for turning about a substantially vertical axis; a rotor bearing ring mounted on said vertical frame for oscillation about a substantially horizontal axis; a gyro rotor mounted within said rotor bearing ring on a substantially horizontal spin axis at right angles to said horizontal oscillation axis; a substantially horizontal caging ring surrounding said vertical frame; means for mounting said ring for vertical movement on said support; a horizontal gear on said vertical frame; a manually operable pinion associated with said gear and mounted for turning and axial displacement on said outer support; and intermediary means including a cam, arranged to be operated by an axial displacement of said pinion into engagement with said gear, for vertically moving said caging ring into contact with said rotor bearing ring, thereby aligning the same with and arresting the same in a horizontal plane.

5. In a directional gyroscope an outer support; a vertical frame mounted on said outer support for turning about a substantially vertical axis; a rotor bearing ring mounted on said vertical frame for oscillation about a substantially horizontal axis; a gyro rotor mounted within said rotor bearing ring on a substantially horizontal spin axis at right angles to said horizontal oscillation axis; a substantially horizontal caging ring surrounding said vertical frame; means for mounting said ring for vertical movement on said support; a lever pivotally mounted on said support and bearing against said caging ring; a horizontal gear mounted on said vertical frame; a pinion associated with said gear and mounted for turning and axial displacement on said outer support; a movable cam member arranged to act on said lever for moving said caging ring into contact with said rotor bearing ring; manual operating means for jointly actuating said cam member and axially moving said pinion into engagement with said horizontal gear; and a releasable detent for maintaining said cam member in a position in which the rotor bearing ring is arrested while the gear and pinion mesh, said detent being connected to be released by said operating means upon such displacement of the latter as to move said pinion and gear out of engagement.

6. In a directional gyroscope an outer support; a vertical frame mounted on said outer support for turning about a substantially vertical axis; a rotor bearing ring mounted on said vertical frame for oscillation about a substantially horizontal axis; a gyro rotor mounted within said rotor bearing ring on a substantially horizontal spin axis at right angles to said horizontal oscillation axis; a substantially horizontal caging ring; means for mounting said ring for vertical movement on said support; a lever pivotally mounted on said support and bearing against said caging ring; a horizontal gear mounted on said vertical frame; a manually operable shaft mounted for turning and axial displacement on said support; a pinion secured to said shaft and associated with said gear; a cam member slidably arranged on said shaft and arranged to act on said lever; a spring tending to maintain the cam member in its inactive position; a detent rendered operative upon axial displacement of said shaft and associated with said cam member for maintaining the latter in its active position; and means associated with said detent and operable by said shaft for releasing the detent upon such displacement of the shaft as to move said pinion and gear out of engagement.

ERNST-AUGUST CORNELIUS.